(12) United States Patent
Song et al.

(10) Patent No.: US 10,567,968 B2
(45) Date of Patent: Feb. 18, 2020

(54) INFORMATION CONFIGURATION METHOD, INFORMATION CONFIGURATION APPARATUS AND COMMUNICATION SYSTEM

(71) Applicant: FUJITSU LIMITED, Kawasaki-shi, Kanagawa (JP)

(72) Inventors: Lei Song, Beijing (CN); Hongchao Li, Beijing (CN); Yi Zhang, Beijing (CN); Hua Zhou, Beijing (CN)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 15/220,728

(22) Filed: Jul. 27, 2016

(65) Prior Publication Data

US 2016/0337864 A1 Nov. 17, 2016

Related U.S. Application Data

(63) Continuation of application No. PCT/CN2014/071696, filed on Jan. 28, 2014.

(51) Int. Cl.
*H04W 16/10* (2009.01)
*H04W 88/02* (2009.01)
(Continued)

(52) U.S. Cl.
CPC .......... *H04W 16/10* (2013.01); *H01Q 1/246* (2013.01); *H01Q 21/061* (2013.01); *H01Q 21/24* (2013.01);
(Continued)

(58) Field of Classification Search
None
See application file for complete search history.

(56) References Cited

U.S. PATENT DOCUMENTS

2012/0213261 A1* 8/2012 Sayana ............... H04L 5/0048
  375/224
2013/0039326 A1* 2/2013 Kim ..................... H04B 7/024
  370/329
(Continued)

FOREIGN PATENT DOCUMENTS

CN  102740447 A  10/2012
CN  102938688 A  2/2013
(Continued)

OTHER PUBLICATIONS

International Search Report issued for corresponding International Patent Application No. PCT/CN2014/071696, dated Oct. 27, 2014, with an English translation.

(Continued)

*Primary Examiner* — Lonnie V Sweet
(74) *Attorney, Agent, or Firm* — Myers Wolin, LLC.

(57) ABSTRACT

An information configuration method, an information configuration apparatus and a communication system, wherein the method includes: the base station configures a user equipment (UE) with a mapping relation between configuration information of one or more sets of reference signals and indication information indicating the configuration information according to an antenna port formed by virtualizing a two-dimensional planar antenna array. By configuring the UE with the configuration information by the base station according to the antenna port formed by virtualizing the two-dimensional planar antenna array, the configuration information is adaptive to the two-dimensional planar antenna array, such that the user end accurately acquires the configuration information of the array.

14 Claims, 8 Drawing Sheets

(51) Int. Cl.
  *H04W 88/08*   (2009.01)
  *H01Q 1/24*    (2006.01)
  *H01Q 21/06*   (2006.01)
  *H01Q 21/24*   (2006.01)
  *H04B 7/0413*  (2017.01)
  *H04L 5/00*    (2006.01)

(52) U.S. Cl.
  CPC ......... *H04B 7/0413* (2013.01); *H04L 5/0048* (2013.01); *H04W 88/02* (2013.01); *H04W 88/08* (2013.01)

(56) References Cited

U.S. PATENT DOCUMENTS

| | | | | |
|---|---|---|---|---|
| 2013/0114656 | A1* | 5/2013 | Sayana | H04B 7/024 375/219 |
| 2013/0120191 | A1 | 5/2013 | Zhang et al. | |
| 2013/0308714 | A1 | 11/2013 | Xu et al. | |
| 2014/0003240 | A1* | 1/2014 | Chen | H04W 28/08 370/235 |
| 2014/0016549 | A1 | 1/2014 | Novlan et al. | |
| 2014/0192762 | A1* | 7/2014 | Li | H04L 25/03929 370/329 |
| 2014/0226509 | A1* | 8/2014 | Ko | H04B 7/0626 370/252 |
| 2015/0139112 | A1 | 5/2015 | Park et al. | |
| 2016/0020846 | A1* | 1/2016 | Wang | H04B 7/0456 370/329 |
| 2017/0005712 | A1* | 1/2017 | Jiang | H04B 7/0413 |

FOREIGN PATENT DOCUMENTS

| | | |
|---|---|---|
| CN | 103259580 A | 8/2013 |
| EP | 2 645 616 A2 | 10/2013 |
| EP | 2 950 458 A1 | 12/2015 |
| EP | 2 645 616 A3 | 4/2017 |
| JP | 2012-15920 A | 1/2012 |
| WO | 2013/024350 A2 | 2/2013 |
| WO | 2013/147565 A2 | 10/2013 |
| WO | 2014/007511 A1 | 1/2014 |
| WO | 2014/010986 A1 | 1/2014 |
| WO | 2014/010994 A1 | 1/2014 |

OTHER PUBLICATIONS

Written Opinion of the International Searching Authority issued for corresponding International Patent Application No. PCT/CN2014/071696, dated Oct. 27, 2014, with an English translation.

Extended European search report with supplementary European search report and the European search opinion issued by the European Patent Office for corresponding European Patent Application No. 14881129.2, dated Aug. 21, 2017.

Notice of Preliminary Rejection issued for corresponding Korean Patent Application No. 10-2016-7020899 dated Jul. 26, 2017 with an English translation.

Notification of Reasons for Refusal issued for corresponding Japanese Patent Application No. 2016-548275, dated Jun. 27, 2017, with an English translation.

Notice of Preliminary Rejection issued for corresponding Korean Patent Application No. 10-2018-7013988, dated Jun. 10, 2018, with an English translation.

Notice of Final Rejection issued by the Korean Intellectual Property Office for corresponding Korean Patent Application No. 10-2016-7020899 dated Feb. 7, 2018, with an English translation.

Notice of Final Rejection issued for corresponding Korean Patent Application No. 10-2016-7020899 dated Apr. 16, 2018, with an English translation.

First Notification of Office Action and Search Report issued by the China National Intellectual Property Administration for corresponding Chinese Patent Application No. 201480071687.6, dated Nov. 2, 2018, with an English translation.

Notice of Preliminary Rejection issued by the Korean Intellectual Property Office for corresponding Korean Patent Application No. 10-2018-7013988, dated Mar. 15, 2019, with an English translation.

Second Notification of Office Action issued by the China National Intellectual Property Administration for corresponding Chinese Patent Application No. 201480071687.6, dated Apr. 28, 2019, with an English translation.

Communication pursuant to Article 94(3) EPC issued by the European Patent Office for corresponding European Patent Application No. 14 881 129.2-1220, dated Jan. 25, 2019.

Notice of Final Rejection issued for corresponding Korean Patent Application No. 10-2018-7013988, dated Dec. 31, 2018, with an English translation.

Decision of Rejection issued by the China National Intellectual Property Administration for corresponding Chinese patent application No. 201480071687.6, dated Sep. 4, 2019; full English translation attached.

Notice of Final Rejection issued by the Korean Intellectual Property Office for corresponding Korean Patent Application No. 10-2018-7013988 dated Jun. 11, 2019 with an English translation.

Communication pursuant to Article 94(3) EPC issued by the European Patent Office for corresponding European Patent Application No. 14881129.2 dated Oct. 2, 2019.

* cited by examiner

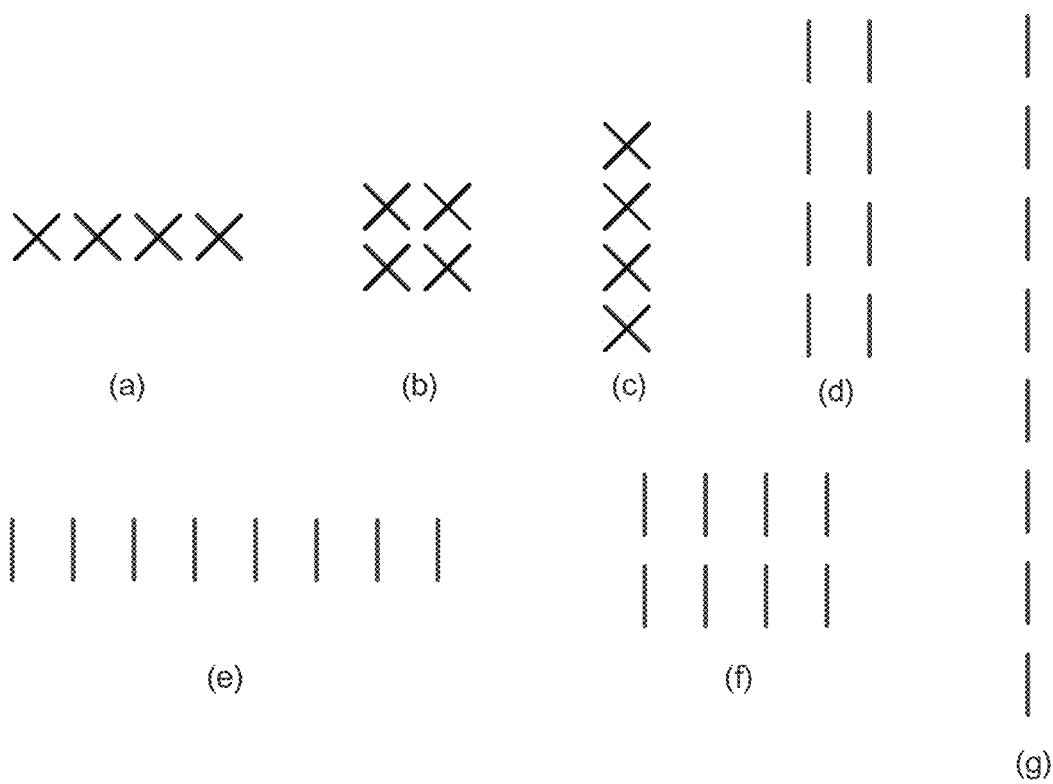
Fig. 3
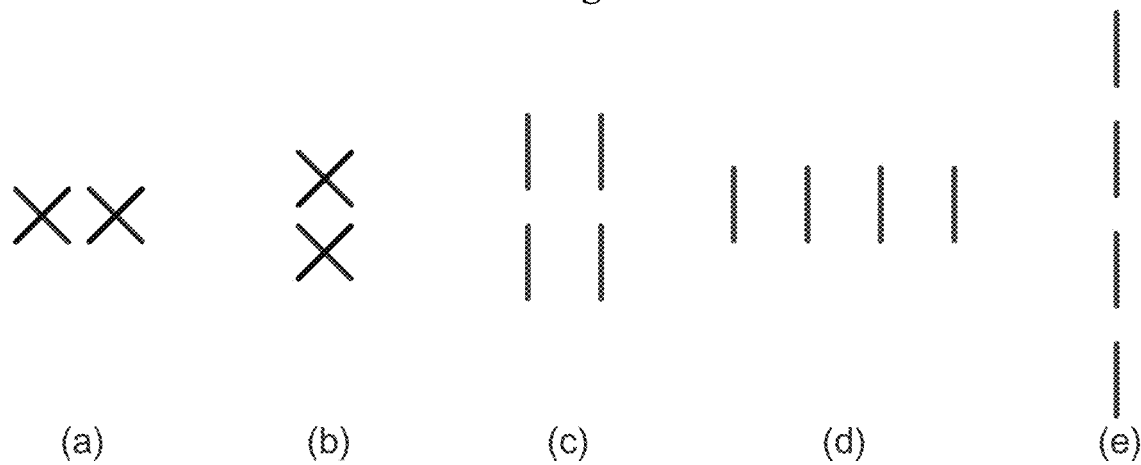
Fig. 4
501
A base station configures a user equipment with a mapping relation between configuration information of one or more sets of reference signals and indication information indicating the configuration information, according to an antenna port formed by virtualizing a two-dimensional planar antenna array
Fig. 5

INFORMATION CONFIGURATION METHOD, INFORMATION CONFIGURATION APPARATUS AND COMMUNICATION SYSTEM

CROSS REFERENCE TO RELATED APPLICATIONS

This application is a continuation application of International Application PCT/CN2014/071696 filed on Jan. 28, 2014, the entire contents of which are incorporated herein by reference.

TECHNICAL FIELD

The disclosure relates to the field of communications, and particularly, to an information configuration method, an information configuration apparatus and a communication system.

BACKGROUND

The Multiple-Input Multiple-Output (MIMO) technology is one of the important physical layer technologies for the Long Term Evolution-Advanced (LTE-Advanced) system, and it is used to provide the space diversity gain, the spatial multiplexing gain and the array gain.

In LTE version 11 and the previous technologies, the MIMO technology uses a horizontally arranged one-dimensional (1D) linear array and has the adaptive ability in a horizontal plane, i.e., it is a two-dimensional (2D) MIMO technology. FIGS. 1-2 are schematic diagrams of structures of two conventional planar arrays. FIG. 1 is a schematic diagram of a structure of a cross-polarization two-dimensional planar array, and FIG. 2 is a schematic diagram of a structure of a uniform linear two-dimensional planar array.

In the studies of version 12, the two-dimensional planar array is introduced in combination with the technology related to the Active Antenna System (AAS), thus an adaptive control can be given in either the horizontal dimension or elevation dimension to better improve the system performance, i.e., it is a three-dimensional (3D) MIMO technology.

As illustrated in FIG. 1, each column is arranged with M cross-polarization antenna pairs in the vertical direction, and totally N columns of cross-polarization antenna pairs are arranged in the horizontal direction. As illustrated in FIG. 2, each column is arranged with M antenna arrays of the same polarization direction (the vertical polarization antennas as illustrated in FIG. 2) in the vertical direction, and totally N columns are arranged in the horizontal direction. In the above two configurations, the number of antenna ports in the horizontal direction may be equal to the number of antenna ports of the previous LTE version, such as 1, 2, 4 or 8, etc. A plurality of physical antennas in the vertical direction may form a virtual physical antenna port to reduce the number of antenna ports which transmit reference signals. When there is one antenna port in the vertical direction, the two-dimensional planar array will degenerate to the conventional one-dimensional array, while the three-dimensional MIMO technology will also correspondingly degenerate to the two-dimensional MIMO technology.

It shall be noted that the above description of the background is merely provided for clear and complete explanation of the present disclosure and for easy understanding by those skilled in the art. And it shall not be understood that the above technical solution is known to those skilled in the art as it is described in the background of the present disclosure.

SUMMARY

When there are more than 1 antenna port in the vertical direction, although the transmission signal may be adjusted in the horizontal and vertical planes by sufficiently using the 3D MIMO technology, the total number of antenna ports is much larger than that of any previous version, thus the reference signal, in particular the Channel State Information Reference Signal (CSI-RS), occupies more resources. In addition, since the antennas are changed from one-dimensional into two-dimensional, reference signal configuration information in the previous version also causes confusions under the two-dimensional planar array. For example, when only the total number of antenna ports is configured while there are multiple antenna arrangement modes meeting the total number of antenna ports, the receiving end cannot accurately acquire the numbers of antenna ports in the horizontal direction and the vertical direction.

For example, it requires no separable configuration in the horizontal direction or the vertical direction when an information configuration is performed for information of the CSI-RS, such as the number of antenna ports, resources, subframes and power, etc. according to the current version protocols TS 36.331 and V11.5.0, i.e., antennaPortsCount-r10 ENUMERATED {an1, an2, an4, an8},
resourceConfig-r10 INTEGER(0 . . . 31),
subframeConfig-r10 INTEGER(0 . . . 154),
p-C-r10 INTEGER(−8 . . . 15), But the antennas of the previous versions are all one-dimensional, and the current antenna arrangement mode can be determined when the configuration information indicates the number of antenna ports. If the two-dimensional antenna arrays are used, the antenna arrangement mode cannot be determined when only the number of antenna ports is informed. FIG. 3 is a schematic diagram of possible antenna arrangements under the condition of 8 antenna ports, and FIG. 4 is a schematic diagram of possible antenna arrangements under the condition of 4 antenna ports. As illustrated in FIGS. 3 and 4, 7 and 5 possible antenna arrangements are given under the conditions of 8 and 4 antenna ports, respectively. Therefore, it is not enough to configure the number of transmitting antenna ports just according to the current version protocols.

In order to solve the above problem, the embodiments of the present disclosure provide an information configuration method, an information configuration apparatus and a communication system, which are adaptive to the two-dimensional planar antenna array.

A first aspect of the embodiments of the present disclosure provides an information configuration apparatus, including:

a first configuration unit configured to configure a user equipment (UE) with configuration information of one or more sets of reference signals according to an antenna port formed by virtualizing a two-dimensional planar antenna array;

the configuration information including one or more pieces of the following information:

indication information of antenna polarization, indication information of an antenna port in a horizontal direction or a vertical direction; the number of antenna ports in a horizontal direction and the number of antenna ports in a vertical direction; the total number of antenna ports of a system and the number of antenna ports in a horizontal direction; the total number of antenna ports of a system and the number of antenna ports in a vertical direction; indication information of antenna arrangement mode; indication information of whether a reference signal is weighted or not; the number of sets of configured reference signals; the number of user-specific reference signal ports in a vertical direction; an index of a column where an antenna port in a vertical direction is located; the number of antenna ports in each column in a vertical direction or the total number of antenna ports occupied in a vertical direction; the number of user-specific reference signal ports in a horizontal direction; an index of a row where an antenna port in a horizontal direction is located; and the number of antenna ports in each row in a horizontal direction or the total number of antenna ports occupied in a horizontal direction.

A second aspect of the embodiments of the present disclosure provides an information configuration apparatus, including:

an information transmitting unit configured to transmit to a user equipment (UE) indication information indicating configuration information of one or more sets of reference signals used by the UE;

the configuration information including one or more pieces of the following information: indication information of antenna polarization, indication information of an antenna port in a horizontal direction or a vertical direction; the number of antenna ports in a horizontal direction and the number of antenna ports in a vertical direction; the total number of antenna ports of a system and the number of antenna ports in a horizontal direction; the total number of antenna ports of a system and the number of antenna ports in a vertical direction; indication information of antenna arrangement mode; indication information of whether a reference signal is weighted or not; the number of sets of configured reference signals; the number of user-specific reference signal ports in a vertical direction; an index of a column where an antenna port in a vertical direction is located; the number of antenna ports in each column in a vertical direction or the total number of antenna ports occupied in a vertical direction; the number of user-specific reference signal ports in a horizontal direction; an index of a row where an antenna port in a horizontal direction is located; and the number of antenna ports in each row in a horizontal direction or the total number of antenna ports occupied in a horizontal direction.

A third aspect of the embodiments of the present disclosure provides an information configuration apparatus, including:

an information receiving unit configured to receive indication information transmitted by a base station indicating configuration information of one or more sets of reference signals used by a user equipment (UE);

the configuration information including one or more pieces of the following information: indication information of antenna polarization, indication information of an antenna port in a horizontal direction or a vertical direction; the number of antenna ports in a horizontal direction and the number of antenna ports in a vertical direction; the total number of antenna ports of a system and the number of antenna ports in a horizontal direction; the total number of antenna ports of a system and the number of antenna ports in a vertical direction; indication information of antenna arrangement mode; indication information of whether a reference signal is weighted or not; the number of sets of configured reference signals; the number of user-specific reference signal ports in a vertical direction; an index of a column where an antenna port in a vertical direction is located; the number of antenna ports in each column in a vertical direction or the total number of antenna ports occupied in a vertical direction; the number of user-specific reference signal ports in a horizontal direction; an index of a row where an antenna port in a horizontal direction is located; and the number of antenna ports in each row in a horizontal direction or the total number of antenna ports occupied in a horizontal direction.

A fourth aspect of the embodiments of the present disclosure provides a base station, including the information configuration apparatus according to the first aspect.

A fifth aspect of the embodiments of the present disclosure provides a base station, including the information configuration apparatus according to the second aspect.

A sixth aspect of the embodiments of the present disclosure provide a user equipment (UE), including the information configuration apparatus according to the third aspect.

A seventh aspect of the embodiments of the present disclosure provide a communication system, including a user equipment (UE) and a base station, the base station is configured to transmit to the UE indication information indicating configuration information of one or more sets of reference signals used by the UE; the configuration information includes one or more pieces of the following information: indication information of antenna polarization, indication information of an antenna port in a horizontal direction or a vertical direction; the number of antenna ports in a horizontal direction and the number of antenna ports in a vertical direction; the total number of antenna ports of a system and the number of antenna ports in a horizontal direction; the total number of antenna ports of a system and the number of antenna ports in a vertical direction; indication information of antenna arrangement mode; indication information of whether a reference signal is weighted or not; the number of sets of configured reference signals; the number of user-specific reference signal ports in a vertical direction; an index of a column where an antenna port in a vertical direction is located; the number of antenna ports in each column in a vertical direction or the total number of antenna ports occupied in a vertical direction; the number of user-specific reference signal ports in a horizontal direction; an index of a row where an antenna port in a horizontal direction is located; and the number of antenna ports in each row in a horizontal direction or the total number of antenna ports occupied in a horizontal direction; and the UE is configured to receive the indication information, and perform corresponding processing according to the configuration information and received reference information.

The embodiments of the present disclosure have the following beneficial effect: by configuring the UE with the configuration information by the base station according to the antenna port formed by virtualizing the two-dimensional planar antenna array, the configuration information is adaptive to the two-dimensional planar antenna array, such that the user end accurately acquires the configuration information of the array.

With reference to the following description and drawings, the particular embodiments of the present disclosure are disclosed in detail, and the principles of the present disclosure and the manners of use are indicated. It shall be understood that the scope of the embodiments of the present disclosure is not limited thereto. The embodiments of the present disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It shall be emphasized that the term "comprise/include" used in this specification is taken to specify the presence of stated features, integers, steps or components but does not preclude the presence or addition of one or more other features, integers, steps, components or groups thereof.

BRIEF DESCRIPTION OF THE DRAWINGS

The drawings are included to provide further understanding of the present disclosure, which constitute a part of the specification and illustrate the preferred embodiments of the present disclosure, and are used for setting forth the principles of the present disclosure together with the description. It is obvious that drawings in the following description are just some embodiments of the present disclosure. And other drawings may be obtained by those skilled in the art according to these drawings without making an inventive effort. In the drawings:

FIG. 3 is a schematic diagram of possible antenna arrangements under the condition of 8 antenna ports;

FIG. 4 is a schematic diagram of possible antenna arrangements under the condition of 4 antenna ports;

FIG. 5 is a flow diagram of an implementation of an information configuration method according to Embodiment 1 of the present disclosure;

DESCRIPTION OF THE EMBODIMENTS

Figure 1:
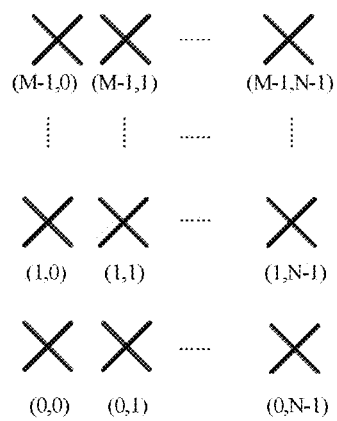
FIG. 1 is a schematic diagram of a structure of a cross-polarization two-dimensional planar array.

The above and other features of the present disclosure will be apparent with reference to the following description and the attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims. Next, various embodiments of the present disclosure will be described with reference to the drawings.

Embodiment 1

Embodiment 1 of the present disclosure provides an information configuration method, and FIG. 5 illustrates a flow diagram of the method. Referring to FIG. 5, the method includes:

step 501: a base station configures a user equipment (UE) with a mapping relation between configuration information of one or more sets of reference signals and indication information indicating the configuration information, according to an antenna port formed by virtualizing a two-dimensional planar antenna array;

the configuration information including one or more pieces of the following information: indication information of antenna polarization, indication information of an antenna port in a horizontal direction or a vertical direction; the number of antenna ports in a horizontal direction and the number of antenna ports in a vertical direction; the total number of antenna ports of a system and the number of antenna ports in a horizontal direction; the total number of antenna ports of a system and the number of antenna ports in a vertical direction; indication information of antenna arrangement mode; indication information of whether a reference signal is weighted or not; the number of sets of configured reference signals; the number of user-specific reference signal ports in a vertical direction; an index of a column where an antenna port in a vertical direction is located; the number of antenna ports in each column in a vertical direction or the total number of antenna ports occupied in a vertical direction; the number of user-specific reference signal ports in a horizontal direction; an index of a row where an antenna port in a horizontal direction is located; and the number of antenna ports in each row in a horizontal direction or the total number of antenna ports occupied in a horizontal direction.

In this embodiment, by configuring the UE with the configuration information by the base station according to the antenna port formed by virtualizing the two-dimensional planar antenna array, the configuration information is adaptive to the two-dimensional planar antenna array, such that the user end accurately acquires the configuration information of the array.

In this embodiment, an indication state of n bits may be used to indicate the configuration information, where n is a positive integer. For example, indication states "0" and "1" of one bit may be used to indicate two sets of configuration information; and indication states "00, 01, 10, 11" of two bits may be used to indicate four sets of configuration information. The number of bits used to indicate the configuration information may be determined based on the actual condition.

In this embodiment, the above mapping relation may be configured at the base station side, and stored in the user side and the base station side, such that the UE can perform corresponding processing according to configuration information corresponding to indication information after receiving the indication information. Next, the configurations of the configuration information and the mapping relation by the base station side will be exemplarily described.

In an implementation of this embodiment, when an antenna port in a horizontal direction or a vertical direction is independently configured, the configuration information includes: an indication of the antenna port in the horizontal direction or the vertical direction, an indication of the antenna polarization and/or an indication of the antenna arrangement mode.

In that case, the user end can determine the array configuration of the transmitting end according to the configuration information, without additionally configuring the total number of antenna ports of the system, which facilitates the user end to recover information of the whole channel (formed by all transmitting-end antennas and the user-end antennas), so as to reduce the occupied resource elements, avoid the decrease of resource elements for the data transmission service, and improve the throughput of the system.

The configuration information may further include a resource, and/or a subframe, and/or power information in a horizontal direction and/or a vertical direction.

In this embodiment, when an antenna port in a horizontal direction or a vertical direction is independently configured, the configuration information may specifically include:
 (1-a) horizontal or vertical antenna port indication enumeration {horizontal, vertical},
 (1-b) polarization indication enumeration {0/90 cross-polarization, 45/−45 cross-polarization, vertical polarization, horizontal polarization, . . . },
 (1-c) the number of antenna ports enumeration {an1, an2, an4, an8},
 (1-d) resourceConfig-r10 INTEGER(0 . . . 31),
 (1-e) subframeConfig-r10 INTEGER(0 . . . 154),
 (1-f) p-C-r10 INTEGER(−8 . . . 15), In this embodiment, a configuration may be only performed in the horizontal direction or the vertical direction, or respectively performed in the two directions.

In this embodiment, the configuration information containing the above information may be one or more sets, which are indicated with indication information of n bits, respectively, and the specific number of bits may be determined based on the actual condition.

For example, when a configuration of four sets of configuration information is performed in the horizontal direction, an indication may be made with indication information of 2 bits, as shown in Table 1. The situation is the similar when a configuration is performed in the vertical direction, and herein is omitted.

TABLE 1

Mapping relation between the configuration information and the indication information

| Indication information of 2 bits | Configuration information |
|---|---|
| 00 | Configuration information I |
| 01 | Configuration information II |
| 10 | Configuration information III |
| 11 | Configuration information IV |

In another implementation of this embodiment, when an antenna port in a horizontal direction or a vertical direction is jointly configured, the configuration information includes: an indication of the antenna polarization, and/or the numbers of the antenna ports in the horizontal direction and the vertical direction, and the configuration information may further include a resource, and/or a subframe, and/or power information in a horizontal direction and a vertical direction.

In this embodiment, resource information and/or subframe information in the horizontal direction and the vertical direction may be configured in one or more sets. For instance, in the following example of the configuration information, (3-c) is an example where the resource information is configured in one set, and (4-c) is an example where the resource information is configured in more than one set.

For example, when an antenna port in a horizontal direction or a vertical direction is jointly configured, the configuration information specifically includes:
 (2-a) polarization indication enumeration {cross-polarization, vertical polarization, horizontal polarization, . . . },
 (2-b) the number of antenna ports in a horizontal direction enumeration {an1, an2, an4, an8, . . . },
 (2-c) the number of antenna ports in a vertical direction enumeration {an1, an2, an4, an8, . . . },
 (2-d) resourceConfig-r10 in a horizontal direction INTEGER(0 . . . 31),
 (2-e) resourceConfig-r10 in a vertical direction INTEGER(0 . . . 31),
 (2-f) subframeConfig-r10 in a horizontal direction INTEGER(0 . . . 154),
 (2-g) subframeConfig-r10 in a vertical direction INTEGER(0 . . . 154),
 (2-h) p-C-r10 in a horizontal direction INTEGER(−8 . . . 15),
 (2-i) p-C-r10 in a vertical direction INTEGER(−8 . . . 15), In this embodiment, if the parameters in the vertical direction and the horizontal direction are always the same, the configuration may be performed only once; for example, (2-f) and (2-g) are jointly configured, and (2-h) and (2-i) are jointly configured.

In another implementation of this embodiment, when an antenna port in a horizontal direction or a vertical direction is jointly configured, the configuration information includes an indication of the antenna polarization, and/or the total number of antenna ports of a system and the number of antenna ports in the horizontal direction or the vertical direction.

For example, the above configuration information (2-b) and (2-c) may be amended as:
 (2-b1) the total number of antenna ports of a system enumeration {an1, an2, an4, an8, . . . },
 (2-c1) the number of antenna ports in a horizontal direction enumeration {an1, an2, an4, an8, . . . }, or,
 (2-b2) the total number of antenna ports of a system enumeration {an1, an2, an4, an8, . . . }, (2-c2) the number of antenna ports in a vertical direction enumeration {an1, an2, an4, an8, . . . }, Similarly, the configuration information containing the above information may be one or more sets, which are indicated with indication information of n bits, respectively, and the specific number of bits may be determined based on the actual condition, which is similar to Table 1 and herein is omitted.

In another implementation of this embodiment, when antenna ports are configured overall with no separable configuration of a horizontal direction or a vertical direction, the configuration information includes: the number of the antenna ports, and the indication information of the antenna arrangement mode.

For example, when antenna ports are configured overall with no separable configuration of a horizontal direction or a vertical direction, the configuration information specifically includes:

(3-a) the number of antenna ports enumeration {an1, an2, an4, an6, an8, an9, an10, an12, an15, an16, . . . },
(3-b) indication of the antenna arrangement mode enumeration {a, b, c, d, e, f, g, h, i, . . . },
(3-c) resourceConfig-r10 INTEGER(0 . . . 31),
(3-d) subframeConfig-r10 INTEGER(0 . . . 154),
(3-e) p-C-r10 INTEGER(-8 . . . 15), where, a, b, c, d, e, f, g, h, i, etc. in (3-b) are indexes of possible antenna arrangement modes.

Similarly, the configuration information containing the above information may be one or more sets, which are indicated with indication information of n bits, respectively, and the specific number of bits may be determined based on the actual condition, which is similar to Table 1 and herein is omitted.

In this embodiment, when estimation and feedback are performed in a horizontal direction and a vertical direction independently, the configuration cycle and/or feedback cycle of them may be different from each other due to their different channel variation characteristics. On this basis, a relatively accurate channel estimation result can be obtained. Next, the description takes an example in which the configuration/feedback cycle in the vertical direction is longer than that in the horizontal direction.

The signal received by the user end is in a form of $Y=HW_VW_Hs+n$, where H is an actual transmission channel, $W_V$ and $W_H$ are precoding matrixes in a vertical direction and a horizontal direction, respectively, s is a transmitted signal, and n is noise superimposed at the user end. The dimensions of the channel and the precoding matrix are H: $N_R \times MN$ $W_V$: $MN \times x$ $W_H$: $x \times RI$, where x indicates the number of columns of $W_V$ and the number of rows of $W_H$, e.g., $x=NN_V$, ($N_V<M$), where $N_V$ indicates the number of data flows supported in the vertical direction, then a product of a 3D channel and precoding matrixes in the vertical direction and the horizontal direction may be expressed in a form of block matrix:

$$HW_VW_H = [H_1 \quad H_2 \quad \ldots \quad H_N]$$
$$\text{diag}\{W_V^1, W_V^2, \ldots, W_V^N\}\text{diag}\{W_H^1, W_H^2, \ldots, W_H^{N_V}\}$$
$$= [H_1W_V^1 \quad H_2W_V^2 \quad \ldots \quad H_NW_V^N]\text{diag}\{W_H^1, W_H^2, \ldots, W_H^{N_V}\}$$
$$W_V = \text{diag}\{W_V^1, W_V^2, \ldots, W_V^N\}(MN \times NV_V) \quad W_V^n(M \times N_V)$$
$$W_H = \text{diag}\{W_H^1, W_H^2, \ldots, W_H^{N_V}\}(NN_V \times N_HN_V) \quad W_H^n(N \times N_H)$$

where, $H_n$ (n=1, 2, . . . , N) indicates channel messages between the nth column of physical antennas of the transmitting end and all antennas of the user end, $W_V^n$; ($M \times N_r$) indicates a precoding matrix of the nth column of channels in the vertical direction, N indicates the number of antennas in the horizontal direction and M indicates the number of antennas in the vertical direction, which are positive integers. Thus one, some or all of the columns of H may be used to estimate the precoding matrix $W_V^n$ ($M \times N_r$) in the vertical direction or multiple $W_V^n$ ($M \times N_r$) or the whole matrix $W_V$, and more channel information is acquired so as to estimate a PMI estimation in the vertical direction.

In this embodiment, x may also be valued in other manner, which is not limited herein.

The user end may be at different positions, and various columns of channels in the vertical direction are also different from each other, thus when those columns of channels are slightly different from each other, the PMI value estimated for each column is identical. In order to utilize the reference signal resource most efficiently, the user end may be configured differently so as to estimate different numbers of vertical channels (a channel consisting of each column of vertically arranged antenna ports and all the antennas of the user end is a vertical channel). Meanwhile, an index of a column where a vertical antenna is located may also be transmitted such that the user end better recovers the whole 3D channel information.

Thus, in this embodiment, the configuration information may be further configured to include one or more of indication information of whether a reference signal is weighted or not; the number of sets of configured reference signals; the number of user-specific reference signal ports in a vertical direction; an index of a column where an antenna port in a vertical direction is located; the number of antenna ports in each column in a vertical direction or the total number of antenna ports occupied in a vertical direction; the number of user-specific reference signal ports in a horizontal direction; an index of a row where an antenna port in a horizontal direction is located; and the number of antenna ports in each row in a horizontal direction or the total number of antenna ports occupied in a horizontal direction.

In an implementation of this embodiment, the configuration information includes the number of sets of configured reference signals. For example, when a plurality of reference signal resources are configured for antennas in a vertical direction, the configuration information may include:

(4-a) the number of antenna ports of each column in a vertical direction enumeration {an1, an2, an3, an4, . . . },
(4-b) index of a column where an antenna port in a vertical direction is located enumeration {c1, c2, c3, . . . },
(4-c) resourceConfig-r10 INTEGER(0 . . . 31), INTEGER(0 . . . 31), INTEGER(0 . . . 31), . . . .
(4-d) subframeConfig-r10 INTEGER(0 . . . 154),
(4-e) p-C-r10 INTEGER(-8 . . . 15), where c1, c2, c3, etc. are different combinations of indexes of a plurality of columns, e.g., when the system has 4 columns of antennas, there are $2^4$ possible column combinations, i.e., all 16 possibilities are indicated with 4 bits. The occupation of vertical antenna column may also be indicated with a bit mapping method, i.e., when there are four columns of antennas, each column is indicated with one bit, wherein when corresponding bit is 1, it means that the vertical column is configured with a reference signal resource, and when corresponding bit is 0, it means that the vertical column is configured with no reference signal resource.

Similarly, the configuration information containing the above information may be one or more sets, which are indicated with indication information of n bits, respectively, and the specific number of bits may be determined based on the actual condition, which is similar to Table 1 and herein is omitted.

In this embodiment, by configuring multiple sets of configuration information, i.e., using a plurality of reference signal resources, the receiving end can estimate more channel information, so as to better perform a CSI measurement.

In an implementation of this embodiment, the configuration information includes the number of sets of configured reference signals. For example, when one reference signal resource is configured for all antennas occupied in a vertical direction, the configuration information may include:

the total number of antenna ports occupied in a vertical direction enumeration {an1, an2, an3, an4, . . . },
index of a column where an antenna port is located in a vertical direction enumeration {c1, c2, c3, . . . },
resourceConfig-r10 INTEGER(0 . . . 31),
subframeConfig-r10 INTEGER(0 . . . 154),
p-C-r10 INTEGER(−8 . . . 15), In that case, a plurality of columns of antenna ports transmitting a reference signal in a vertical direction occupy a reference signal configuration of a large number of ports.

In this embodiment, after the user end acquires $W_V$ or precoding matrix $W_V''$ (M×$N_r$) of some columns, since the PMI update cycle in the vertical direction is relatively long, $HW_V$ or a part of columns thereof may be used to estimate the PMI in the horizontal direction. Being similar to the situation in the vertical direction, the reference signal in the horizontal direction may occupy more resources to estimate all columns of $HW_V$, or save some resources to only estimate a part of columns of $HW_V$. The configuration method in the horizontal direction is the same as that in the vertical direction, and herein is omitted.

But in that case, the reference signal in the horizontal direction needs to be weighted with all or a part of sub-matrix blocks of $W_V$. In this embodiment, in order to distinguish the reference signal in the horizontal direction from that in the vertical direction, the configuration information may further include indication information of whether a reference signal is weighted or not, such as weighting indication enumeration {yes, no}

In this embodiment, if the configuration/feedback cycle in the horizontal direction is longer than that in the vertical direction, the reference signal in the vertical direction may also include indication information of whether the reference signal is weighted or not, and its implementation is similar to that of the situation where the configuration/feedback cycle in the vertical direction is longer than that in the horizontal direction, and herein is omitted.

In this embodiment, the reference signal may be a CSI-RS, or an antenna reference signal with a channel estimation function in the communication system, which is not limited herein.

Figure 2:
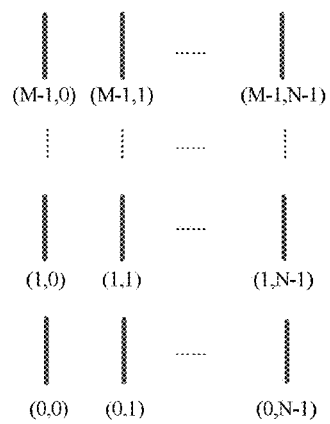
FIG. 2 is a schematic diagram of a structure of a uniform linear two-dimensional planar array.

In this embodiment, the above configuration method and the information contained in the configuration information may be used independently or jointly. For example, when the number of antenna ports of the system is large (at least more than 8), in the uniform linear two-dimensional planer array as illustrated in FIG. 2, any one or more columns of antennas may be defined as a vertical antenna port, any one or more rows of antennas may be defined as a horizontal antenna port, and antenna ports in the horizontal direction and the vertical direction are configured independently. Or, antenna ports in the horizontal direction and the vertical direction may be configured jointly. For another example, when the number of antenna ports of the system is not too large (e.g., less than or equal to 8 or 16), besides the above configuration method, a configuration method requiring no separable configuration in the horizontal direction or the vertical direction may also be used. Herein an exemplary description is just given, and the embodiment of the present disclosure is not limited thereto.

As can be seen from the above embodiment, by configuring the UE with the configuration information by the base station according to the antenna port formed by virtualizing the two-dimensional planar antenna array, the configuration information is adaptive to the two-dimensional planar antenna array, such that the user end accurately acquires the configuration information of the array.

Embodiment 2

Embodiment 2 of the present disclosure further provides an information configuration apparatus, as described in the following Embodiment 2. Since the information configuration apparatus solves the problem in a principle similar to that of the method of Embodiment 1, its implementation may refer to that of the method of Embodiment 1, and the same content is omitted herein.

Figure 6:
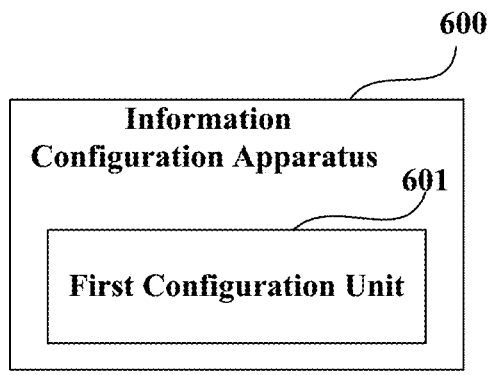
FIG. 6 is a schematic diagram of compositions of an implementation of an information configuration apparatus according to Embodiment 2 of the present disclosure.

FIG. 6 is a schematic diagram of compositions of an information configuration apparatus according to Embodiment 2 of the present disclosure. As illustrated in FIG. 6, an apparatus 600 includes:

a first configuration unit 601 configured to configure a user equipment (UE) with a mapping relation between configuration information of one or more sets of reference signals and indication information indicating the configuration information, according to an antenna port formed by virtualizing a two-dimensional planar antenna array;

the configuration information including one or more pieces of the following information: indication information of antenna polarization, indication information of an antenna port in a horizontal direction or a vertical direction; the number of antenna ports in a horizontal direction and the number of antenna ports in a vertical direction; the total number of antenna ports of a system and the number of antenna ports in a horizontal direction; the total number of antenna ports of a system and the number of antenna ports in a vertical direction; indication information of antenna arrangement mode; indication information of whether a reference signal is weighted or not; the number of sets of configured reference signals; the number of user-specific reference signal ports in a vertical direction; an index of a column where an antenna port in a vertical direction is located; the number of antenna ports in each column in a vertical direction or the total number of antenna ports occupied in a vertical direction; the number of user-specific reference signal ports in a horizontal direction; an index of a row where an antenna port in a horizontal direction is located; and the number of antenna ports in each row in a horizontal direction or the total number of antenna ports occupied in a horizontal direction.

In this embodiment, by configuring the UE with the configuration information by the base station according to the antenna port formed by virtualizing the two-dimensional planar antenna array, the configuration information is adaptive to the two-dimensional planar antenna array, such that the user end accurately acquires the configuration information of the array.

Please refer to Embodiment 1 for the specific configuration of the configuration information, which content is incorporated herein and not repeated.

Similarly, the configuration information containing the above information may be one or more sets, which are indicated with indication information of n bits, respectively, and the specific number of bits may be determined based on the actual condition, which is similar to Table 1 and herein is omitted.

In this embodiment, the reference signal may be a CSI-RS, or an antenna reference signal with a channel estimation function in the communication system, which is not limited herein.

As can be seen from the above embodiment, by configuring the UE with the configuration information by the base station according to the antenna port formed by virtualizing the two-dimensional planar antenna array, the configuration information is adaptive to the two-dimensional planar antenna array, such that the user end accurately acquires the configuration information of the array.

Embodiment 3

Embodiment 3 of the present disclosure further provides a base station, including the information configuration apparatus as described in the Embodiment 2.

Figure 7:
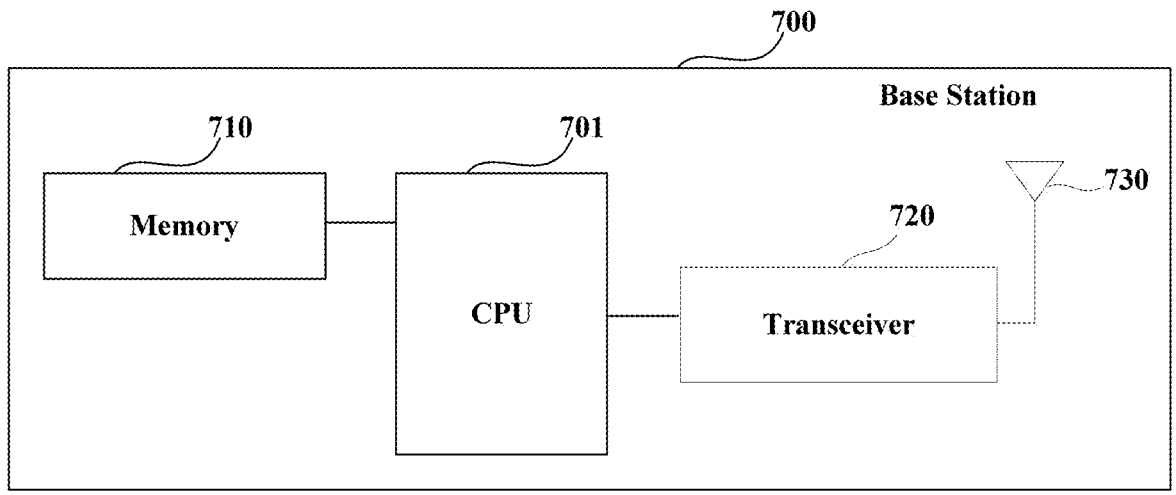
FIG. 7 is a schematic diagram of compositions of an implementation of a base station according to Embodiment 3 of the present disclosure.

FIG. 7 is a schematic diagram of compositions of a base station according to Embodiment 3 of the present disclosure. As illustrated in FIG. 7, a base station 700 may include: a central processing unit (CPU) 701 and a memory 710 coupled to the CPU 701, the memory 710 may store various data and an information processing program, execute the program under the control of the CPU 701 to receive various information sent from a user equipment (UE), and send request information to the UE.

In one implementation, the functions of the information configuration apparatus may be integrated into the CPU 701, the CPU 701 may be configured to configure the UE with a mapping relation between configuration information of one or more sets of reference signals and indication information indicating the configuration information, according to an antenna port formed by virtualizing a two-dimensional planar antenna array; the configuration information is similar to that of Embodiment 1, and its content is incorporated herein and not repeated.

The CPU 701 may be configured such that when an antenna port in a horizontal direction or a vertical direction is independently configured, the configuration information includes: an indication of the antenna port in the horizontal direction or the vertical direction, an indication of the antenna polarization, and/or an indication of the antenna arrangement mode.

The CPU 701 may be configured such that when an antenna port in a horizontal direction or a vertical direction is jointly configured, the configuration information includes: an indication of the antenna polarization, and/or the numbers of the antenna ports in the horizontal direction and the vertical direction; or the configuration information includes: an indication of the antenna polarization, and/or the total number of the antenna ports of the system and the number of antenna ports in the horizontal direction or the vertical direction.

The CPU 701 may be configured such that the configuration information further includes: a resource, and/or a subframe, and/or power information in a horizontal direction and a vertical direction.

The CPU 701 may be configured such that when antenna ports are configured overall with no separable configuration of a horizontal direction and a vertical direction, the configuration information includes: the number of the antenna ports, and the indication information of the antenna arrangement mode.

In another implementation, the information configuration apparatus may be configured as being separate from the CPU. For example, the information configuration apparatus may be configured as a chip connected to the CPU 701, and the functions thereof are realized under the control of the CPU.

In addition, as illustrated in FIG. 7, the base station 700 may further include a transceiver 720 and an antenna 730, the functions of these parts are similar to those in the prior art and are omitted herein. To be noted, the base station 700 does not necessarily include all the parts as illustrated in FIG. 7. In addition, the base station 700 may also include a part not illustrated in FIG. 7, please refer to the prior art.

In this embodiment, by configuring the UE with the configuration information by the base station according to the antenna port formed by virtualizing the two-dimensional planar antenna array, the configuration information is adaptive to the two-dimensional planar antenna array, such that the user end accurately acquires the configuration information of the array.

Embodiment 4

Figure 8:
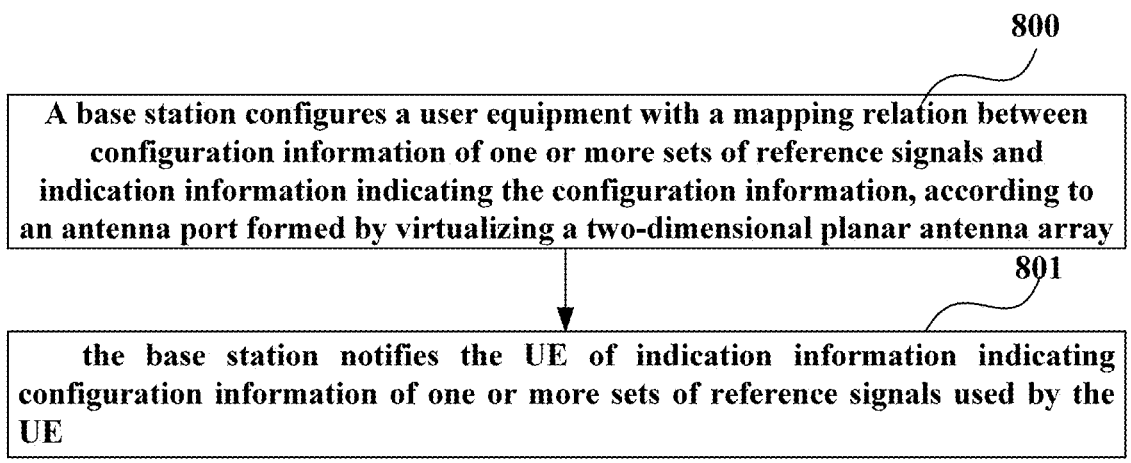
FIG. 8 is a flow diagram of an implementation of an information processing method according to Embodiment 4 of the present disclosure.

FIG. 8 is a flow diagram of an information processing method according to Embodiment 4 of the present disclosure, which is applied to a base station side, including:

step 801: a base station notifies a user equipment (UE) of indication information indicating configuration information of one or more sets of reference signals used by the UE;

the configuration information is similar to that of Embodiment 1, and its content is incorporated herein and not repeated.

Please refer to Embodiment 1 for the specific configuration of the configuration information, which content is incorporated herein and not repeated.

In this embodiment, the reference signal may be a CSI-RS, or an antenna reference signal with a channel estimation function in the communication system, which is not limited herein.

In this embodiment, in order to support the flexible configuration of the transmitting antenna port, configuration information may be transmitted by using downlink control information (DCI) or RRC signaling, which is not limited herein.

Similarly, the configuration information containing the above information may be one or more sets, which are indicated with indication information of n bits, respectively, and the specific number of bits may be determined based on the actual condition, which is similar to Table 1 and herein is omitted.

In this embodiment, a mapping relation between bits preset in the DCI and one or more sets of configuration information used by the UE may be pre-stored at the base station side and the UE side, and the base station only needs to transmit DCI information to the UE, such that the UE acquires current configuration information from corresponding bit value in the DCI information according to the pre-stored mapping relation, i.e., performs corresponding processing according to the configuration information and received reference information.

In this embodiment, before the base station notifies the UE of the indication information, the method may further include:

step 800: the base station configures a user equipment (UE) with a mapping relation between configuration information of one or more sets of reference signals and indication information indicating the configuration information, according to an antenna port formed by virtualizing a two-dimensional planar antenna array.

As can be seen from the above embodiment, by configuring the UE with the configuration information according to the antenna port formed by virtualizing the two-dimensional planar antenna array, the configuration information is adaptive to the two-dimensional planar antenna array, such that the user end accurately acquires the configuration information of the array. By notifying the UE of indication information indicating configuration information of one or more sets of reference signals used by the UE, the base station enables the user to perform corresponding processing according to the indicated configuration information.

Embodiment 5

Figure 9:
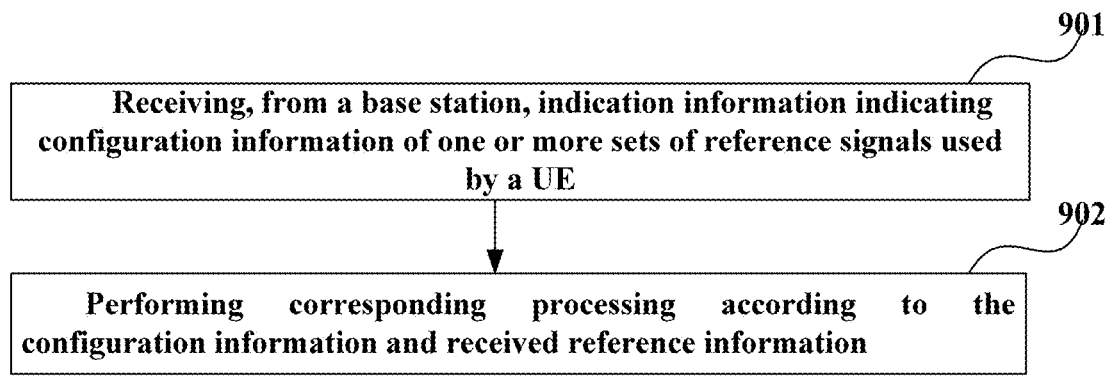
FIG. 9 is a flow diagram of an implementation of an information processing method according to Embodiment 5 of the present disclosure.

FIG. 9 is a flow diagram of an information processing method according to Embodiment 5 of the present disclosure, which is applied to a UE side. As illustrated in FIG. 9, the method includes:

step 901: a UE receives, from a base station, indication information indicating configuration information of one or more sets of reference signals used by the UE; information contained in the configuration information is described in Embodiment 1, and its content is incorporated herein and not repeated;

step 902: the UE performs corresponding processing according to the configuration information and received reference information.

In this embodiment, for example the horizontal and/or vertical channel may be estimated according to the number of horizontal and/or vertical antennas and occupied resources indicated in the configuration information, and a CSI measurement may be performed at an indicated antenna port to complete corresponding processing such as reporting.

In this embodiment, please refer to Embodiment 1 for the specific configuration of the configuration information, which content is incorporated herein and not repeated.

Similarly, the configuration information containing the above information may be one or more sets, which are indicated with indication information of n bits, respectively, and the specific number of bits may be determined based on the actual condition, which is similar to Table 1 and herein is omitted.

In this embodiment, the reference signal may be a CSI-RS, or an antenna reference signal with a channel estimation function in the communication system, which is not limited herein.

In this embodiment, a precoding matrix may be selected according to the configuration information in step 902.

Figure 10:
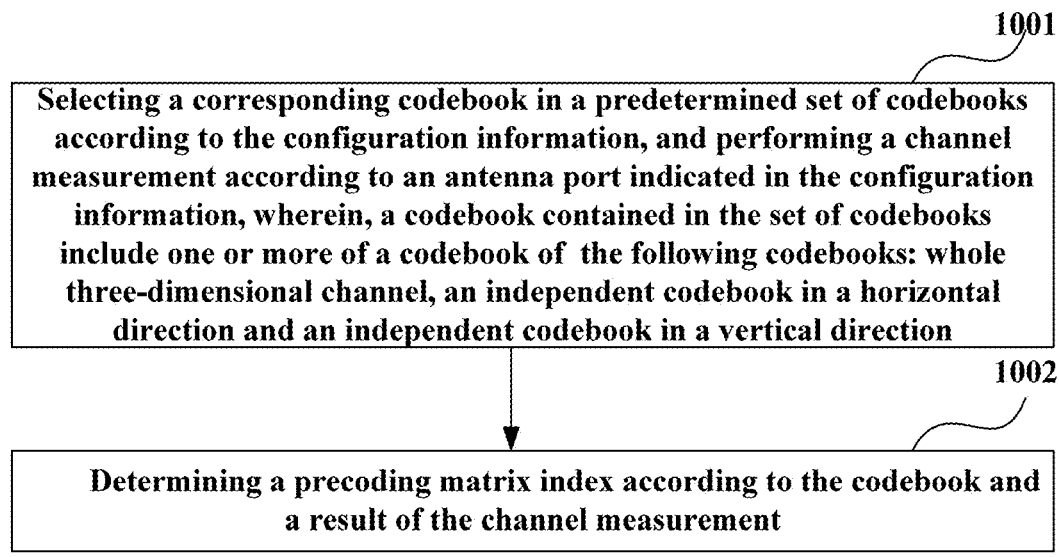
FIG. 10 is a schematic diagram of compositions of an implementation of step 902 according to Embodiment 5 of the present disclosure.

FIG. 10 is a flow diagram of a processing method of step 902 according to this embodiment. As illustrated in FIG. 10, the processing method includes:

step 1001: a UE selects a corresponding codebook in a predetermined set of codebooks according to the configuration information, and performs a channel measurement according to an antenna port indicated in the configuration information, step 1002: the UE determines a precoding matrix index according to the codebook and a result of the channel measurement;

A codebook contained in the set of codebooks include one or more of the following codebooks: a codebook of whole three-dimensional channel, an independent codebook in a horizontal direction and an independent codebook in a vertical direction.

For example, when information is configured using the information configuration method of Embodiment 1, the codebook is a function of the antenna polarization configuration and the number of antenna ports. The UE determines its used configuration information according to the received indication information, and selects a corresponding one from predefined sets of codebooks according to antenna configuration condition in the configuration information. The UE selects an appropriate precoding matrix index (PMI) from the codebook according to the result of the channel measurement, and feed it back to the base station side.

As can be seen from the above embodiment, by configuring the UE with the configuration information according to the antenna port formed by virtualizing the two-dimensional planar antenna array, the configuration information is adaptive to the two-dimensional planar antenna array, such that the user end accurately acquires the configuration information of the array. By notifying the UE of indication information indicating configuration information of one or more sets of reference signals used by the UE, the base station enables the user to perform corresponding processing according to the indicated configuration information.

Embodiment 6

Embodiment 6 of the present disclosure further provides an information processing apparatus, as described in the following Embodiment 6. Since the information processing apparatus solves the problem in a principle similar to that of the method of Embodiment 4, its implementation may refer to that of the method of Embodiment 4, and the same content is omitted herein.

Figure 11:
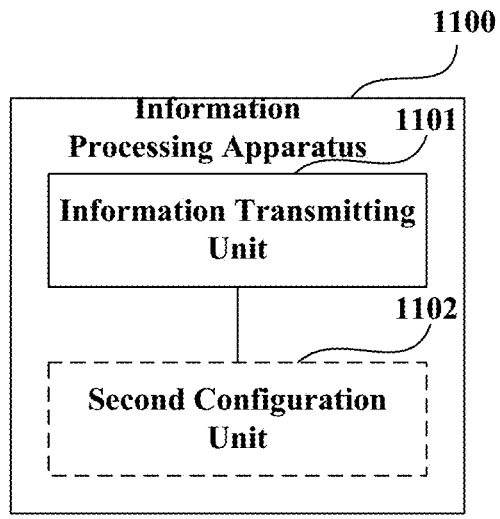
FIG. 11 is a schematic diagram of compositions of an implementation of an information processing apparatus according to Embodiment 6 of the present disclosure.

FIG. 11 is a schematic diagram of compositions of an information processing apparatus. As illustrated in FIG. 11, an apparatus 1100 includes:

an information transmitting unit 1101 configured to transmit to a user equipment (UE) indication information indicating configuration information of one or more sets of reference signals used by the UE; the configuration information is configured for the UE according to an antenna port formed by virtualizing a two-dimensional planar antenna array; information contained in the configuration information is described in Embodiment 1, and its content is incorporated herein and not repeated.

Please refer to Embodiment 1 for the specific configuration of the configuration information, which content is incorporated herein and not repeated.

In this embodiment, the reference signal may be a CSI-RS, or an antenna reference signal with a channel estimation function in the communication system, which is not limited herein.

In this embodiment, in order to support the flexible configuration of the transmitting antenna port, the configuration information may be transmitted by using downlink control information (DCI) or RRC signaling, which is not limited herein. Please refer to Embodiment 4 for the specific indication mode, which is not repeated herein.

In this embodiment, the apparatus further includes:

a second configuration unit 1102 configured to configure the UE with a mapping relation between the configuration information and indication information indicating the configuration information according to an antenna port formed by virtualizing a two-dimensional planar antenna array.

As can be seen from the above embodiment, by configuring the UE with the configuration information according to the antenna port formed by virtualizing the two-dimensional planar antenna array, the configuration information is adaptive to the two-dimensional planar antenna array, such that the user end accurately acquires the configuration information of the array. By notifying the UE of indication information indicating configuration information of one or more sets of reference signals used by the UE, the base station enables the user to perform corresponding processing according to the indicated configuration information.

Embodiment 7

Embodiment 7 of the present disclosure further provides a base station, including the information configuration apparatus as described in the Embodiment 6.

Figure 12:
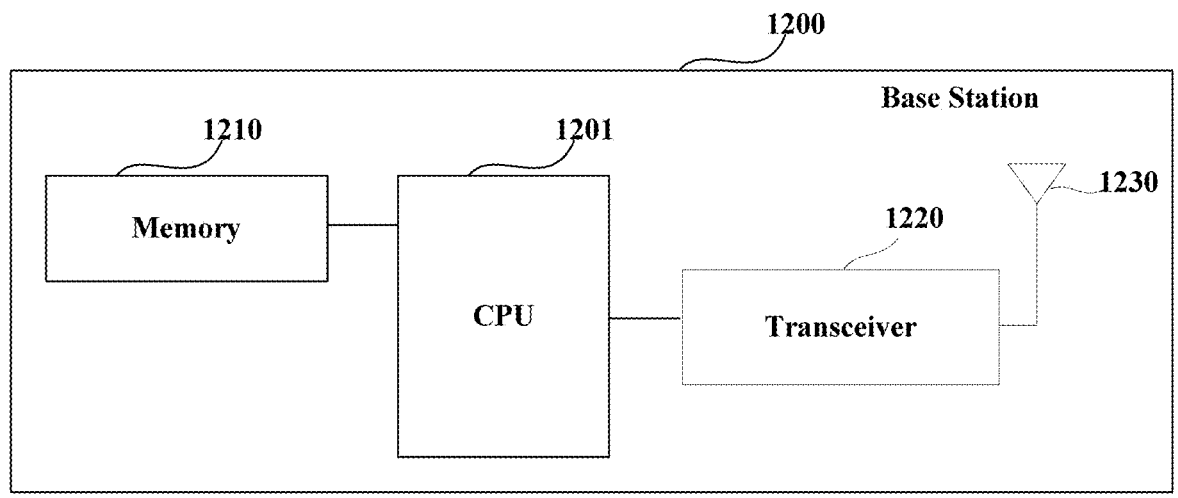
FIG. 12 is a schematic diagram of compositions of an implementation of a base station according to Embodiment 7 of the present disclosure.

FIG. 12 is a schematic diagram of compositions of a base station according to Embodiment 7 of the present disclosure. As illustrated in FIG. 12, a base station 1200 may include: a central processing unit (CPU) 1201 and a memory 1210 coupled to the CPU 1201, the memory 1210 may store various data and an information processing program, execute the program under the control of the CPU 1201 to receive various information sent from a user equipment (UE), and send request information to the UE.

In one implementation, the functions of the information configuration apparatus may be integrated into the CPU 1201, the CPU 1201 may be configured such that a base station notifies the UE of indication information indicating configuration information of one or more sets of reference signals used by the UE; the configuration information is configured for the UE according to an antenna port formed by virtualizing a two-dimensional planar antenna array.

The CPU 1201 may be configured such that the base station configures a mapping relation between the configuration information and indication information indicating the configuration information, according to an antenna port formed by virtualizing a two-dimensional planar antenna array; information contained in the configuration information is described in Embodiment 1, and its content is incorporated herein and not repeated.

In another implementation, the information configuration apparatus may be configured as being separate from the CPU. For example, the information configuration apparatus may be configured as a chip connected to the CPU 1201, and the functions thereof are realized under the control of the CPU.

In addition, as illustrated in FIG. 12, the base station 1200 may further include a transceiver 1220 and an antenna 1230, the functions of these parts are similar to those in the prior art and are omitted herein. To be noted, the base station 1200 does not necessarily include all the parts as illustrated in FIG. 12. In addition, the base station 1200 may also include a part not illustrated in FIG. 12, please refer to the prior art.

As can be seen from the above embodiment, by configuring the UE with the configuration information according to the antenna port formed by virtualizing the two-dimensional planar antenna array, the configuration information is adaptive to the two-dimensional planar antenna array, such that the user end accurately acquires the configuration information of the array. By notifying the UE of indication information indicating configuration information of one or more sets of reference signals used by the UE, the base station enables the user to perform corresponding processing according to the indicated configuration information.

Embodiment 8

Embodiment 8 of the present disclosure further provides an information processing apparatus, as described in the following Embodiment 8. Since the information processing apparatus solves the problem in a principle similar to that of the method of Embodiment 5, its implementation may refer to that of the method of Embodiment 5, and the same content is omitted herein.

Figure 13:
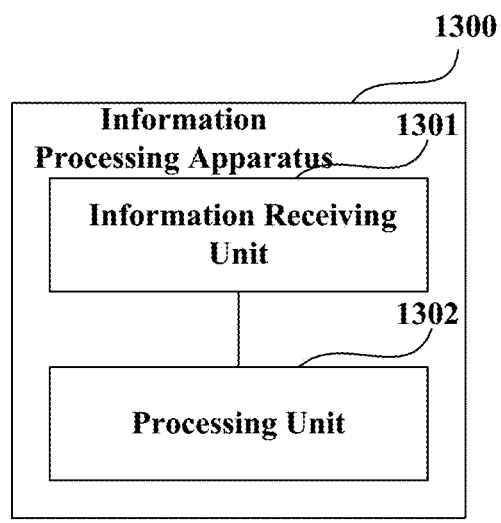
FIG. 13 is a schematic diagram of compositions of an implementation of an information processing apparatus according to Embodiment 8 of the present disclosure.

FIG. 13 is a schematic diagram of compositions of an information processing apparatus. As illustrated in FIG. 13, an apparatus 1300 includes:

an information receiving unit 1301 configured to receive indication information transmitted by a base station indicating configuration information of one or more sets of reference signals used by a user equipment (UE);

information contained in the configuration information is described in Embodiment 1, and its content is incorporated herein and not repeated;

please refer to Embodiment 1 for the specific configuration of the configuration information, which content is incorporated herein and not repeated.

Similarly, the configuration information containing the above information may be one or more sets, which are indicated with indication information of n bits, respectively, and the specific number of bits may be determined based on the actual condition, which is similar to Table 1 and herein is omitted.

In this embodiment, the reference signal may be a CSI-RS, or an antenna reference signal with a channel estimation function in the communication system, which is not limited herein.

In this embodiment, the apparatus further includes:

a processing unit 1302 configured to perform corresponding processing according to the configuration information and received reference information.

Figure 14:
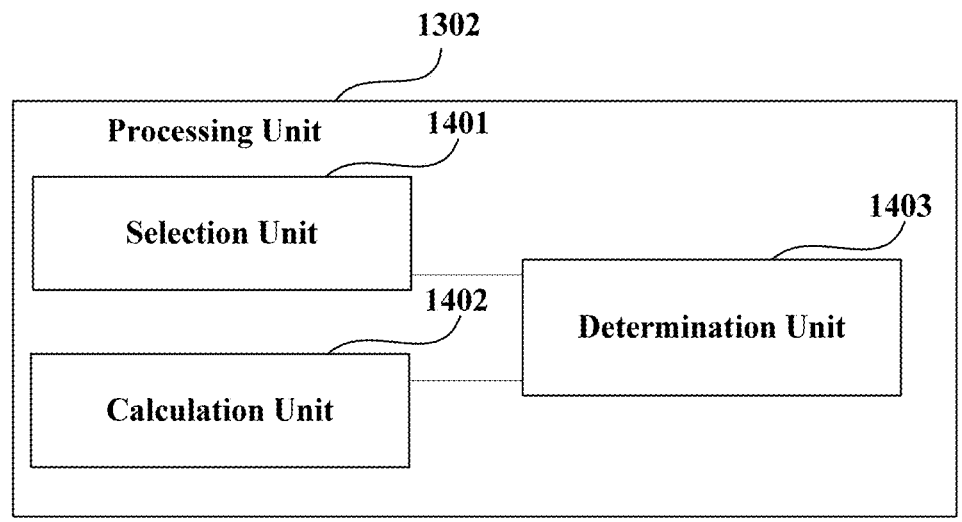
FIG. 14 is a schematic diagram of compositions of an implementation of a processing unit 1302 according to Embodiment 8 of the present disclosure.

FIG. 14 is a schematic diagram of compositions of an implementation of a processing unit 1302 according to Embodiment 8 of the present disclosure, including:

a selection unit 1401 configured to select a corresponding codebook in a predetermined set of codebooks according to the configuration information;

a calculation unit 1402 configured to perform a channel measurement according to an antenna port indicated in the configuration information;

a determination unit 1403 configured to determine a precoding matrix index according to the codebook and a result of the channel measurement.

A codebook contained in the set of codebooks include one or more of the following codebooks: a codebook of whole three-dimensional channel, an independent codebook in a horizontal direction and an independent codebook in a vertical direction.

As can be seen from the above embodiment, by configuring the UE with the configuration information according to the antenna port formed by virtualizing the two-dimensional planar antenna array, the configuration information is adaptive to the two-dimensional planar antenna array, such that the user end accurately acquires the configuration information of the array. By notifying the UE of indication information indicating configuration information of one or more sets of reference signals used by the UE, the base station enables the user to perform corresponding processing according to the indicated configuration information.

Embodiment 9

Embodiment 9 of the present disclosure provides a user equipment (UE), including the information configuration apparatus according to Embodiment 8.

Figure 15:
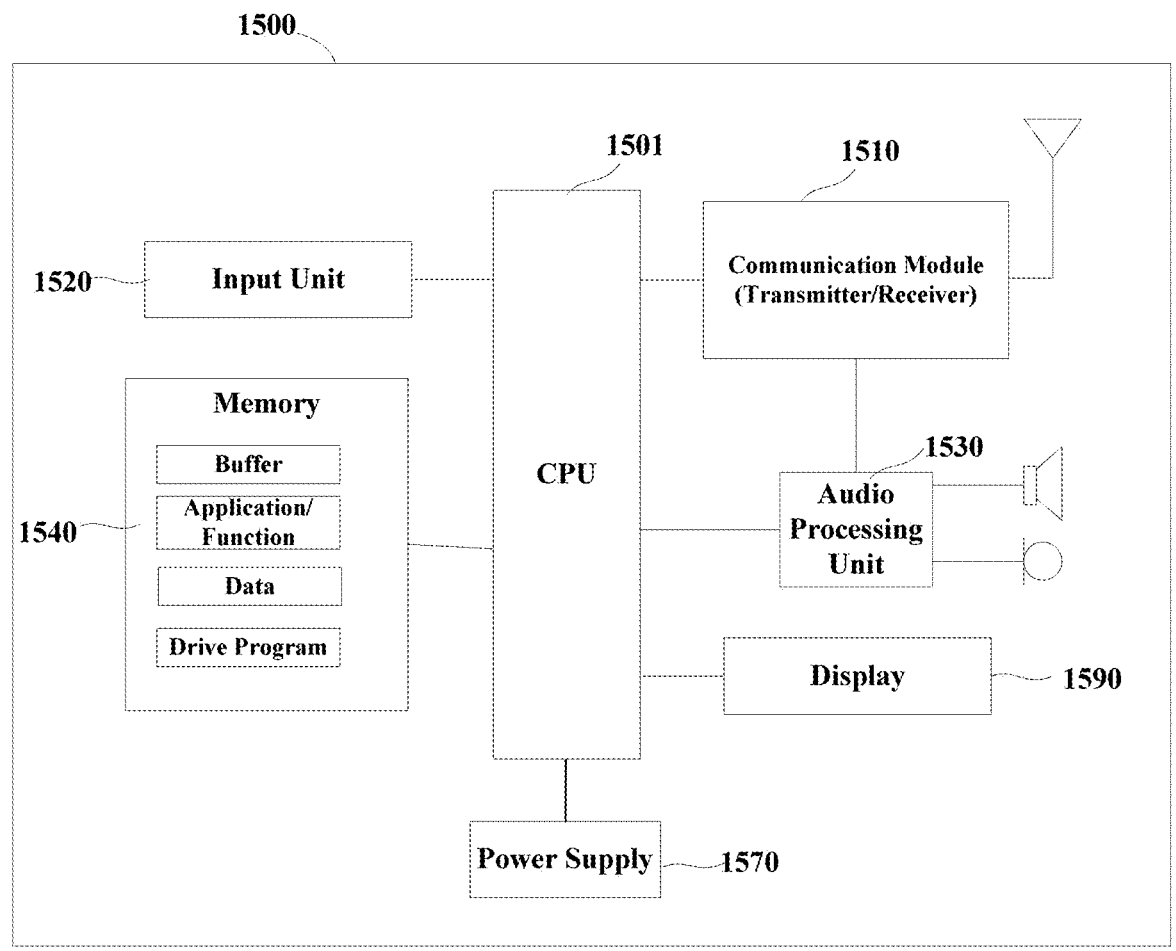
FIG. 15 is a schematic diagram of compositions of an implementation of a user equipment (UE) according to Embodiment 9 of the present disclosure.

FIG. 15 is a block diagram of a system structure of a UE 1500 according to the embodiment of the present disclosure. As shown in FIG. 15, the UE 1500 may include a CPU 1501 and a memory 1540 coupled to the CPU 1501. To be noted, the diagram is exemplary, and other type of structure may also be used to supplement or replace the structure, so as to realize the telecom function or other function.

In one implementation, the functions of the information processing apparatus may be integrated into the CPU 1501, the CPU 1501 may be configured to receive indication information transmitted by a base station indicating configuration information of one or more sets of reference signals used by the UE, the configuration information being configured for the UE according to an antenna port formed by virtualizing a two-dimensional planar antenna array, and perform corresponding processing according to the configuration information and received reference information, information contained in the configuration information being described in Embodiment 1, and its content is incorporated herein and not repeated.

The CPU 1501 may be configured to select a corresponding codebook in a predetermined set of codebooks according to the configuration information, perform a channel measurement according to an antenna port indicated in the configuration information, and determine a precoding matrix index according to the codebook and a result of the channel measurement, and a codebook contained in the set of codebooks include one or more of the following codebooks: a codebook of whole three-dimensional channel, an independent codebook in a horizontal direction and an independent codebook in a vertical direction.

In another implementation, the information configuration apparatus may be configured as being separate from the CPU 1501. For example, the information configuration apparatus may be configured as a chip connected to the CPU 1501, and the functions thereof are realized under the control of the CPU.

As illustrated in FIG. 15, the UE 1500 may further include a communication module 1510, an input unit 1520, an audio processing unit 1530, a display 1560, and a power supply 1570. To be noted, the UE 1500 does not necessarily include all parts as illustrated in FIG. 15. In addition, the UE 1500 may also include a part not illustrated in FIG. 15, please refer to the prior art.

As illustrated in FIG. 15, the CPU 1501 sometimes is called as a controller or an operation widget, and it may include a microprocessor or other processor device and/or logic device. The CPU 1501 receives an input and controls the operations of respective parts of the UE 1500.

The memory 1540 for example may be one or more of a buffer, a flash memory, a floppy, a removable medium, a volatile memory, a nonvolatile memory or any other appropriate device. It can store failure-related information, and a program executing related information. In addition, the CPU 1501 can execute the program stored in the memory 1540 to store or process information. The functions of other parts are similar to those in the prior art, and are omitted herein. The parts of the UE 1500 may be implemented by a dedicated hardware, firmware, software or combinations thereof, without deviating from the scope of the present disclosure.

As can be seen from the above embodiment, by configuring the UE with the configuration information according to the antenna port formed by virtualizing the two-dimensional planar antenna array, the configuration information is adaptive to the two-dimensional planar antenna array, such that the user end accurately acquires the configuration information of the array. By notifying the UE of indication information indicating configuration information of one or more sets of reference signals used by the UE, the base station enables the user to perform corresponding processing according to the indicated configuration information.

Embodiment 10

Embodiment 10 of the present disclosure provides a communication system, including the base station according to Embodiment 7 and the UE according to Embodiment 9.

Figure 16:
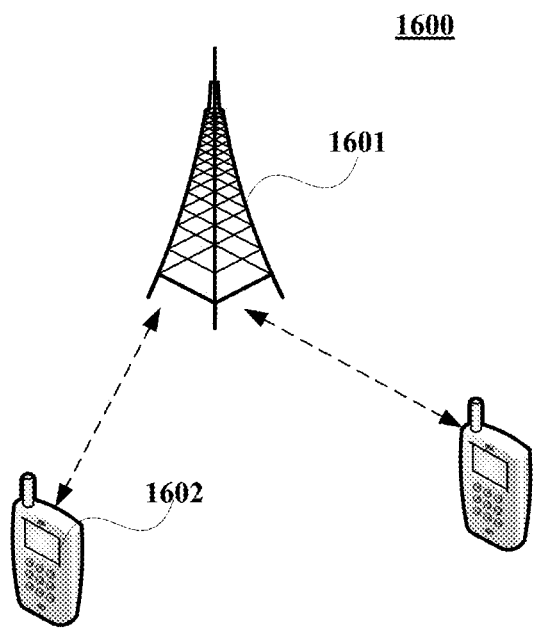
FIG. 16 is a schematic diagram of a topological structure of a communication system according to Embodiment 10 of the present disclosure.

FIG. 16 is a schematic diagram of a structure of a communication system according to Embodiment 10 of the present disclosure. As illustrated in FIG. 16, a communication system 1600 includes a UE 1602 and a base station 1601, the base station 1601 may be the base station 1200 according to Embodiment 7, and the UE 1602 may be the UE 1400 according to Embodiment 9.

The base station 1601 is configured to transmit to the UE 1602 indication information indicating configuration information of one or more sets of reference signals used by the UE 1602; information contained in the configuration information is described in Embodiment 1, and its content is incorporated herein and not repeated.

The UE 1602 is configured to receive the indication information, and perform corresponding processing according to the indication information and received reference information.

The base station 1601 is further configured to configure the UE with a mapping relation between the configuration information and indication information indicating the configuration information according to an antenna port formed by virtualizing a two-dimensional planar antenna array.

The UE 1602 is further configured to select a corresponding codebook in a predetermined set of codebooks according to the configuration information, perform a channel measurement according to an antenna port indicated in the configuration information, and determine a precoding matrix index according to the codebook and a result of the channel measurement, wherein, a codebook contained in the set of codebooks include one or more of the following codebooks: a codebook of whole three-dimensional channel, an independent codebook in a horizontal direction and an independent codebook in a vertical direction.

Please refer to Embodiment 1 for the specific configuration of the configuration information, which content is incorporated herein and not repeated.

Similarly, the configuration information containing the above information may be one or more sets, which are indicated with indication information of n bits, respectively, and the specific number of bits may be determined based on the actual condition, which is similar to Table 1 and herein is omitted.

In this embodiment, the reference signal may be a CSI-RS, or an antenna reference signal with a channel estimation function in the communication system, which is not limited herein.

The base station and the UE have been described detailedly in Embodiment 7 and Embodiment 9, respectively, and those contents are incorporated herein and are not repeated.

Figure 17:
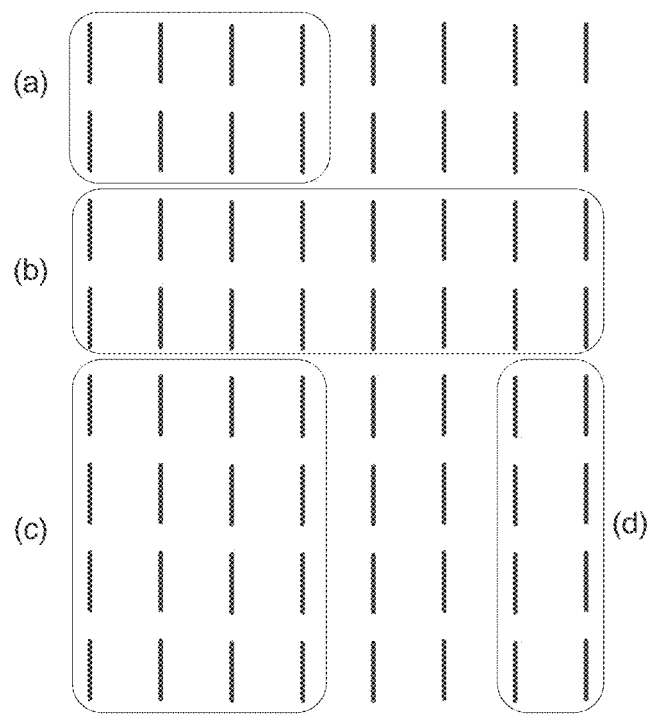
FIG. 17 is a schematic diagram of virtual situations of 64 physical antennas according to Embodiment 10 of the present disclosure.
Figure 18:
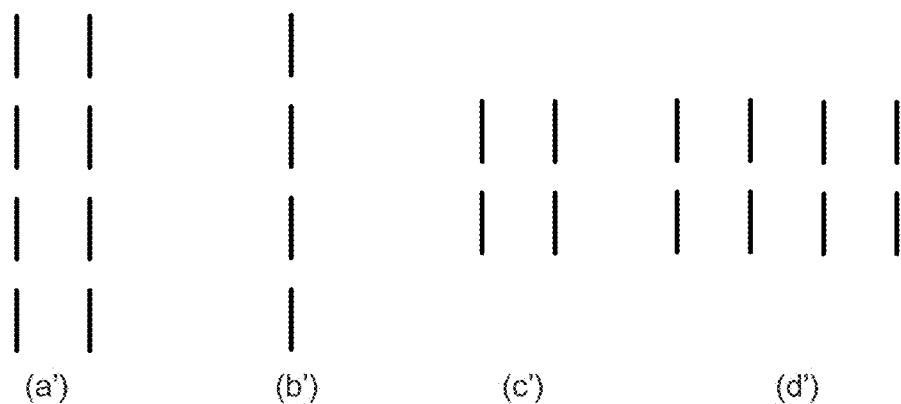
FIG. 18 is a schematic diagram of an antenna port formed after virtualizing the physical antennas according to Embodiment 10 of the present disclosure.

In this embodiment, for example when the system is configured with a lot of physical antennas, multiple physical antennas may be virtualized into one antenna port. In order to flexibly support beam forming in the horizontal direction or the vertical direction, the number of physical antennas included in each virtual antenna port may be adaptively adjusted, so as to adjust the width of the generated beam. FIG. 17 is a schematic diagram of virtual situations of 64 physical antennas. As illustrated in FIG. 17, the base station side is totally configured with 64 vertical polarization physical antennas, each row in the horizontal direction is arranged with 8 physical antennas, and each column in the vertical direction is arranged with 8 physical antennas. The 64 physical antennas may be virtualized in the manner illustrate in (a), i.e., every 4 physical antennas in the horizontal direction and every two physical antennas in the vertical direction are virtualized into one antenna port, other manners such as those illustrated in (b), (c) and (d) may also be feasible. FIG. 18 is a schematic diagram of an antenna port formed after virtualizing the physical antennas in any manner illustrated in (a), (b), (c) and (d). The base station side may notify the UE of the configuration information of the reference signal through an RRC signaling or a DCI form in the method according to Embodiment 1. Specifically, the base station may configure a user with CSI-RS configuration information or CSI-PROCESS configuration information and/or UE-specific RS (DMRS) information corresponding to physical antenna virtual port pattern (a'), (b'), (c') and (d') in FIG. 17 through an RRC signaling. The physical antenna virtual port pattern is not limited to the above examples, and the number thereof may be one or more. The base station uses the DCI or RRC signaling to indicate the user to take one of previously configured physical antenna virtual port patterns, and the user performs CSI measurement and feedback, data demodulation, etc. according one piece of the configuration information.

As can be seen from the above embodiment, by configuring the UE with the configuration information according to the antenna port formed by virtualizing the two-dimensional planar antenna array, the configuration information is adaptive to the two-dimensional planar antenna array, such that the user end accurately acquires the configuration information of the array. By notifying the UE of indication information indicating configuration information of one or more sets of reference signals used by the UE, the base station enables the user to perform corresponding processing according to the indicated configuration information.

The embodiment of the present disclosure also provides a computer readable program, wherein when being executed in an information configuration apparatus or a base station, the program enables the information configuration apparatus or the base station to perform the information configuration method according to Embodiment 1.

The embodiment of the present disclosure also provides a storage medium which stores a computer readable program, wherein the computer readable program enables an information configuration apparatus or a base station to perform the information configuration method according to Embodiment 1.

The embodiment of the present disclosure also provides a computer readable program, wherein when being executed in an information processing apparatus or a base station, the program enables the information configuration apparatus or the base station to perform the information processing method according to Embodiment 4.

The embodiment of the present disclosure also provides a storage medium which stores a computer readable program, wherein the computer readable program enables an information configuration apparatus or a base station to perform the information processing method according to Embodiment 4.

The embodiment of the present disclosure also provides a computer readable program, wherein when being executed in an information processing apparatus or a UE, the program enables the information processing apparatus or the UE to perform the information processing method according to Embodiment 5.

The embodiment of the present disclosure also provides a storage medium which stores a computer readable program, wherein the computer readable program enables an information processing apparatus or a UE to perform the information processing method according to Embodiment 5.

Those skilled in the art will appreciate that all or a part of the steps in any method according to the above embodiments may be carried out by instructing related hardware through a program which may be stored in a computer readable storage medium and which may comprise all or a part of the steps in any method according to the above embodiments when being executed. The storage medium may comprise an ROM, an RAM, a floppy disk, a CD, etc.

The above apparatuses and methods of the present disclosure may be implemented by hardware, or by hardware in combination with software. The present disclosure relates to such a computer readable program that when the program is executed by a logic unit, the logic unit is enabled to carry out the above apparatuses or components as described above, or to carry out the methods or steps as described above. The logic unit for example may be a field programmable logic unit, a microprocessor, a processor used in a computer, etc. The present disclosure also relates to a storage medium for storing the above program, such as a hard disk, a floppy disk, a CD, a DVD, and a flash memory, etc.

The present disclosure is described above with reference to particular embodiments. However, it shall be understood by those skilled in the art that those descriptions are illustrative only, and not intended to limit the protection scope of the present disclosure. Various variants and modifications may be made by those skilled in the art according to the spirits and the principles of the present disclosure, and such variants and modifications fall within the scope of the present disclosure.

What is claimed is:

1. An information configuration apparatus, comprising:
a memory configured to store a plurality of instructions;
a processor circuit coupled to the memory and configured to execute the plurality of instructions to:
configure a user equipment (UE) with configuration information corresponding to one or more sets of reference signal resources;
the configuration information including at least information of whether a reference signal is weighted or not, and the configuration information further including one or more pieces of information selected from a group comprising: information of antenna polarization and the number of sets of configured reference signals; and
transmit indication information to the UE, the indication information of n bits indicating a set index of the configuration information, where there are one or more sets of the configuration information, according to a mapping relation between the configuration information and the indication information.

2. The information configuration apparatus according to claim 1, wherein when an antenna port in a horizontal direction or a vertical direction is independently configured, the configuration information comprises: an indication of the antenna port in the horizontal direction or the vertical direction, an indication of the antenna polarization and/or an indication of the antenna arrangement mode.

3. The information configuration apparatus according to claim 1, wherein when an antenna port in a horizontal direction or a vertical direction is jointly configured, the configuration information comprises: an indication of the antenna polarization, and/or the numbers of the antenna ports in the horizontal direction and the vertical direction; or the configuration information comprises: an indication of the antenna polarization, and/or the total number of the antenna ports of a system and the number of antenna ports in the horizontal direction or the vertical direction.

4. The information configuration apparatus according to claim 3, wherein the configuration information further comprises: a resource, and/or a subframe, and/or power information in a horizontal direction and a vertical direction.

5. The information configuration apparatus according to claim 1, wherein when antenna ports are configured overall with no separable configuration of a horizontal direction and a vertical direction, the configuration information comprises: the number of the antenna ports, and the information of the antenna arrangement mode.

6. An information processing apparatus, comprising:
a memory configured to store a plurality of instructions;
a processor circuit coupled to the memory and configured to execute the plurality of instructions to:
receive indication information of n bits indicating a set index of configuration information, where there are one or more sets of the configuration information; and
perform processing according to a mapping relation between the configuration information and the indication information, wherein
the configuration information includes at least information of whether a reference signal is weighted or not, and the configuration information further including one or more pieces of information selected from a group comprising: information of antenna polarization; and a number of sets of configured reference signals.

7. The information processing apparatus according to claim 6, wherein the processor circuit is further configured to execute the plurality of instructions to:
select a corresponding codebook in a predetermined set of codebooks according to the configuration information;
perform a channel measurement according to an antenna port indicated in the configuration information;
determine a precoding matrix index according to the codebook and a result of the channel measurement;
wherein, a codebook contained in the set of codebooks includes one or more of the following codebooks: a codebook of whole three-dimensional channel, an independent codebook in a horizontal direction and an independent codebook in a vertical direction.

8. A communication system, comprising:
a user equipment (UE); and
a base station comprising:
a processor circuit configured to execute instructions to configure the UE with configuration information corresponding to one or more sets of reference signal resources; and a transmitter configured to transmit indication information of n bits to the UE indicating a set index of the configuration information according to a mapping relation between the configuration information and the indication information, there being one or more sets of the configuration information, wherein
the configuration information includes at least information of whether a reference signal is weighted or not, and the configuration information further including one or more pieces of information selected from a group comprising: information of antenna polarization; and the number of sets of configured reference signals; and
the UE configured to receive the indication information and to perform corresponding processing according to the configuration information and received indication information according to the mapping relation between the configuration information and the indication information.

9. The communication system according to claim 8, wherein the UE is further configured to select a corresponding codebook in a predetermined set of codebooks according to the configuration information; perform a channel measurement according to an antenna port indicated in the configuration information; and determine a precoding matrix index according to the codebook and a result of the channel measurement;
wherein, a codebook contained in the set of codebooks include one or more of the following codebooks: a codebook of whole three-dimensional channel, an independent codebook in a horizontal direction and an independent codebook in a vertical direction.

10. An information configuration apparatus, comprising:
a memory configured to store a plurality of instructions;
a processor circuit coupled to the memory and configured to execute the plurality of instructions to:
configure a user equipment (UE) with configuration information corresponding to one or more sets of reference signal resources wherein the configuration information includes information of whether a reference signal is weighted or not, or includes information of whether a reference signal is weighted or not and the number of sets of configured reference signals; and
transmit indication information to the user equipment, the indication information of n bits indicating a set index of the configuration information according to a mapping relation between the configuration information and the indication information, there being one or more sets of the configuration information.

11. The information configuration apparatus according to claim 10, wherein the configuration information further includes one or more pieces of information selected from the group comprising: information of antenna polarization, information of an antenna port in a horizontal direction or a vertical direction; the number of antenna ports in a horizontal direction and the number of antenna ports in a vertical direction; the total number of antenna ports of a system and the number of antenna ports in a horizontal direction; the total number of antenna ports of a system and the number of antenna ports in a vertical direction; information of antenna arrangement mode; the number of user-specific reference signal ports in a vertical direction; an index of a column where an antenna port in a vertical direction is located; the number of antenna ports in each column in a vertical direction or the total number of antenna ports occupied in a vertical direction; the number of user-specific reference signal ports in a horizontal direction; an index of a row where an antenna port in a horizontal direction is located;

and the number of antenna ports in each row in a horizontal direction or the total number of antenna ports occupied in a horizontal direction.

12. The information configuration apparatus according to claim 1, wherein the configuration information further includes one or more pieces of information selected from the group comprising: the number of antenna ports in a horizontal direction and the number of antenna ports in a vertical direction; the total number of antenna ports of a system and the number of antenna ports in a horizontal direction; the total number of antenna ports of a system and the number of antenna ports in a vertical direction; the number of user-specific reference signal ports in a vertical direction; an index of a column where an antenna port in a vertical direction is located; the number of antenna ports in each column in a vertical direction or the total number of antenna ports occupied in a vertical direction; the number of user-specific reference signal ports in a horizontal direction; an index of a row where an antenna port in a horizontal direction is located; and the number of antenna ports in each row in a horizontal direction or the total number of antenna ports occupied in a horizontal direction.

13. The information configuration apparatus according to claim 1, wherein the indication information is dynamically transmitted via a physical downlink control channel (PDCCH).

14. The information configuration apparatus according to claim 8, wherein the configuration information further includes one or more pieces of information selected from the group comprising: the number of antenna ports in a horizontal direction and the number of antenna ports in a vertical direction; the total number of antenna ports of a system and the number of antenna ports in a horizontal direction; the total number of antenna ports of a system and the number of antenna ports in a vertical direction; information of antenna arrangement mode; the number of sets of configured reference signals; the number of user-specific reference signal ports in a vertical direction; an index of a column where an antenna port in a vertical direction is located; the number of antenna ports in each column in a vertical direction or the total number of antenna ports occupied in a vertical direction; the number of user-specific reference signal ports in a horizontal direction; an index of a row where an antenna port in a horizontal direction is located; and the number of antenna ports in each row in a horizontal direction or the total number of antenna ports occupied in a horizontal direction.

* * * * *